(12) United States Patent
Kumar et al.

(10) Patent No.: US 9,715,453 B2
(45) Date of Patent: Jul. 25, 2017

(54) COMPUTING METHOD AND APPARATUS WITH PERSISTENT MEMORY

(71) Applicant: Intel Corporation, Santa Clara, CA (US)

(72) Inventors: Sanjay Kumar, Hillsboro, OR (US); Rajesh M. Sankaran, Portland, OR (US); Subramanya R. Dulloor, Hillsboro, OR (US); Dheeraj R. Subbareddy, Hillsboro, OR (US); Andrew V. Anderson, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 14/567,662

(22) Filed: Dec. 11, 2014

(65) Prior Publication Data

US 2016/0170645 A1 Jun. 16, 2016

(51) Int. Cl.
*G06F 3/06* (2006.01)
*G06F 12/0842* (2016.01)
(Continued)

(52) U.S. Cl.
CPC ...... *G06F 12/0842* (2013.01); *G06F 12/0238* (2013.01); *G06F 12/0897* (2013.01);
(Continued)

(58) Field of Classification Search
CPC ............... G06F 12/0866; G06F 3/0689; G06F 12/0871; G06F 12/0246; G06F 3/061;
(Continued)

(56) References Cited

U.S. PATENT DOCUMENTS

2007/0288683 A1* 12/2007 Panabaker .............. G06F 12/06
711/101
2008/0109592 A1* 5/2008 Karamcheti .......... G06F 9/5016
711/103
(Continued)

FOREIGN PATENT DOCUMENTS

WO  WO2011-019216 A2   2/2011

OTHER PUBLICATIONS

International Search Report and Written Opinion mailed Mar. 31, 2016 for International Application No. PCT/US2015/059739, 15 pages.

*Primary Examiner* — Mark Giardino, Jr.
*Assistant Examiner* — Edward Waddy, Jr.
(74) *Attorney, Agent, or Firm* — Schwabe, Williamson & Wyatt, P.C.

(57) ABSTRACT

Computer-readable storage media, computing apparatuses and methods associated with persistent memory are discussed herein. In embodiments, a computing apparatus may include one or more processors, along with a plurality of persistent storage modules that may be coupled with the one or more processors. The computing apparatus may further include system software, to be operated by the one or more processors, to receive volatile memory allocation requests and persistent storage allocation requests from one or more applications that may be executed by the one or more processors. The system software may then dynamically allocate memory pages of the persistent storage modules as: volatile type memory pages, in response to the volatile memory allocation requests, and persistent type memory pages, in response to the persistent storage allocation requests. Other embodiments may be described and/or claimed.

25 Claims, 5 Drawing Sheets

(51) Int. Cl.
*G06F 12/02* (2006.01)
*G06F 12/0897* (2016.01)
*G06F 12/1009* (2016.01)

(52) U.S. Cl.
CPC .... *G06F 12/1009* (2013.01); *G06F 2212/225* (2013.01); *G06F 2212/601* (2013.01); *G06F 2212/7201* (2013.01)

(58) Field of Classification Search
CPC ...... G06F 3/0659; G06F 9/5016; G06F 3/064; G06F 12/084; G06F 12/0868; G06F 12/0897; G06F 2212/1044; G06F 2212/604; G06F 12/088; G06F 12/023; G06F 2212/601; G06F 2212/7202; G06F 3/0631; G06F 2212/214; G06F 12/0238; G06F 2212/222; G06F 2212/225; G06F 2212/466; G06F 3/0643; G06F 3/0661; G06F 12/00; G06F 2212/282; G06F 2212/7207; G06F 3/0614; G06F 3/0619; G06F 3/0622; G06F 3/0638; G06F 3/0647; G06F 3/0685
USPC ......... 711/170, E12.019, 113, 114, E12.001, 711/103, 118, 129, 154, E12.008, 711/E12.017, 130, 162, E12.002, 104, 711/E12.038, E12.103, 100, 145, 161, 711/165, 202; 1/1
See application file for complete search history.

(56) References Cited

U.S. PATENT DOCUMENTS

| | | |
|---|---|---|
| 2010/0241815 A1 | 9/2010 | McManis |
| 2012/0137055 A1* | 5/2012 | Lee ..................... G06F 12/0223 |
| | | 711/103 |
| 2013/0086309 A1 | 4/2013 | Lee et al. |
| 2013/0191578 A1 | 7/2013 | Goss et al. |
| 2013/0198453 A1 | 8/2013 | Kim et al. |
| 2013/0238851 A1* | 9/2013 | Chang ..................... G06F 3/061 |
| | | 711/113 |
| 2014/0089511 A1* | 3/2014 | McLean ................ G06F 9/5061 |
| | | 709/226 |
| 2014/0181367 A1* | 6/2014 | Gries .................. G06F 12/0246 |
| | | 711/103 |
| 2015/0279463 A1* | 10/2015 | Berke ..................... G11C 5/04 |
| | | 711/105 |

* cited by examiner

COMPUTING METHOD AND APPARATUS WITH PERSISTENT MEMORY

TECHNICAL FIELD

Embodiments of the present disclosure are related to the field of computing, and in particular, to computing method and apparatus with persistent memory.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Volatile memory (e.g., static random access memory (SRAM), dynamic random access memory (DRAM), etc.) has traditionally been orders of magnitude faster in both latency and bandwidth than persistent storage (e.g., magnetic disk, Flash, etc.). However, volatile memory may come at a higher cost/bit and therefore a more limited capacity when compared with persistent storage. Given these limitations and strengths of volatile memory versus persistent storage, computing systems have traditionally organized them into a tiered architecture. In such an architecture, volatile memory may be directly coupled with a central processing unit (CPU) (e.g., via a memory bus) of a computing device and hence may be directly accessible by instructions of the CPU. Persistent storage, on the other hand, may be coupled with the CPU through an input/output (I/O) controller (e.g., small computer system interface (SCSI), serial advanced technology attachment (SATA), peripheral component interconnect (PCI)-Express, etc.). As a result, volatile memory may be in the CPU's address domain but persistent storage may be in the CPU's I/O controller's address domain. Such a configuration may require an operating system to manage the volatile memory and the persistent storage as distinct volatile and storage domains, respectively. This may lead to certain inefficiencies and additional processes, for example, when loading a data item from persistent storage to volatile memory for access by the CPU.

DETAILED DESCRIPTION OF ILLUSTRATIVE EMBODIMENTS

Methods, computer-readable media, and computing devices associated with having persistent memory are described herein. In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
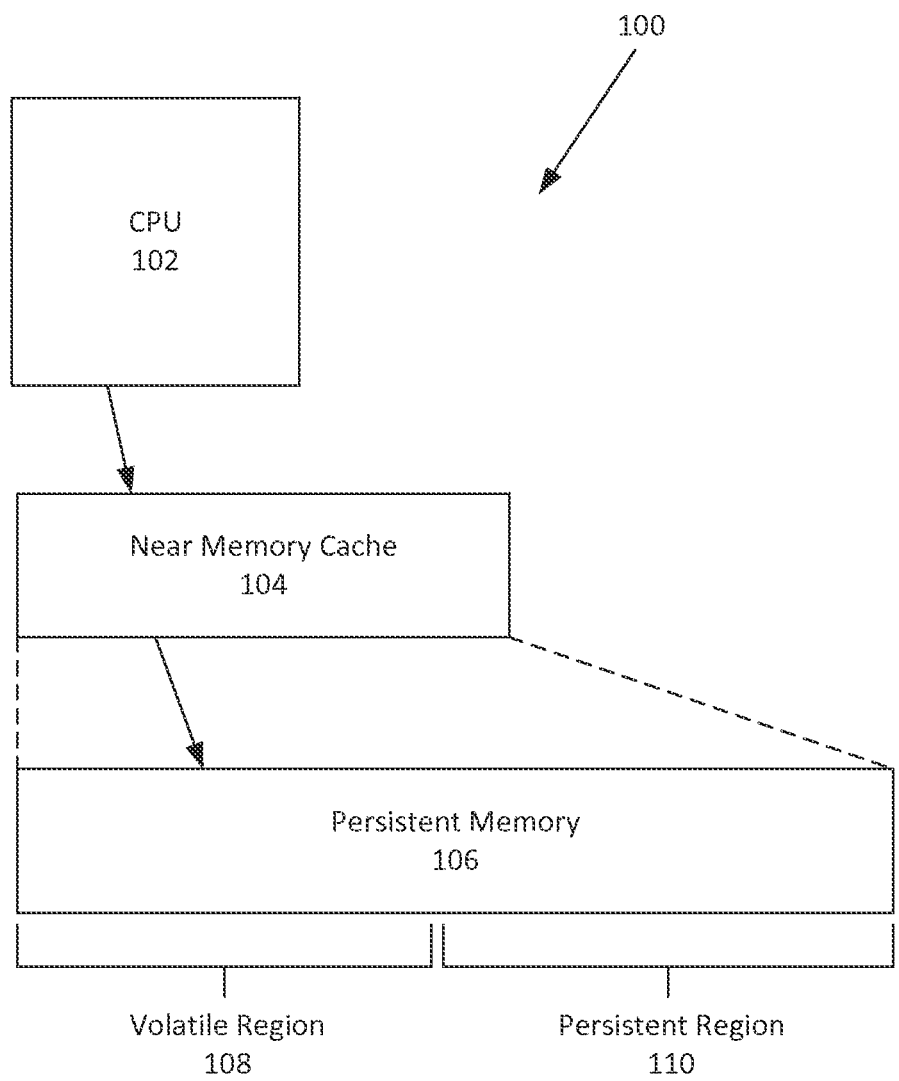
FIG. 1 depicts an illustrative computing system having persistent memory with regions dynamically allocated as volatile type memory or persistent type memory, in accordance with various embodiments of the present disclosure.

FIG. 1 depicts an illustrative portion of a computing system 100 having persistent memory where regions of which may be dynamically allocated as either volatile type memory or persistent type memory, in accordance with various embodiments of the present disclosure. Computing system 100 may include a central processing unit (CPU) 102. As depicted, computing system 100 may have a 2-level memory (2LM) configuration, although other memory configurations may be utilized without departing from the scope of this disclosure. The 2LM configuration may include a first level of memory represented by software transparent near memory cache 104 and a second level of memory represented by persistent memory 106, which may also be referred to in such a configuration as main memory.

As used herein, persistent memory may refer to media having properties of both conventional volatile memory (e.g., dynamic random access memory (DRAM)) and conventional persistent storage devices (e.g., magnetic disk). Like volatile memory, persistent memory may be byte-addressable, which is not possible with conventional persistent storage devices. In addition, persistent memory may be capable of achieving data read and write speeds that are closer to that of volatile memory than conventional storage devices. However, as with conventional persistent storage devices, data stored in persistent memory may be persistent, or non-volatile. As used herein persistent and non-volatile may be treated as synonymous unless the context clearly indicates otherwise. As such, even though the underlying media of persistent memory may be persistent, persistent memory may also be utilized in place of volatile memory to store volatile data in addition to persistent data. An example of volatile data may include, but is not limited to, data concerning an operational state of computing system 100. Volatile data is so named because it is data that may be lost upon reset or shut-down (power off) of computing system 100. Persistent data, on the other hand, may refer to data that may need to be preserved even when computing system 100 may be reset or shut-down (power off). Persistent memory 106 may be formed with memory technology that includes, but is not limited to, phase change memory (PCM), memrister, spin-transfer torque-random access memory (STT-RAM), and so forth.

Persistent memory 106 may be coupled with CPU 102 via a memory bus (not shown). As a result, persistent memory 106 may be part of the CPU 102 addressable physical address space. Because persistent memory 106 may be part of the CPU 102 addressable physical address space, all of persistent memory 106 may be designated by the hardware platform (e.g. a basic input/output system (BIOS)) as capable of storing both volatile and persistent data as depicted by volatile region 108 and persistent region 110. In embodiments, a region may refer to a plurality of memory pages. While volatile region 108 and persistent region 110 may be depicted as being disjoint regions of persistent memory 106, it will be appreciated that this is merely for illustrative purposes and that, in some embodiments, volatile region 108 may include volatile type memory pages interspersed with persistent type memory pages of persistent region 110.

Designating all of persistent memory 106 as capable of storing both volatile and persistent data may enable system software (e.g., system software 202 of FIG. 2) of computing system 100, operated by CPU 102, to receive and service volatile and persistent memory allocation requests from one or more applications, or processes, that may be executed by CPU 102. The system software, in response to such an allocation request, may dynamically allocate memory pages, or regions, of persistent memory 106 as either volatile type memory pages, or regions, or persistent type memory pages, or regions. As such, the system software may be able to dynamically grow or shrink the volatile type memory pages available to CPU 102. As used herein, volatile type memory pages may refer to memory pages of persistent memory 106 allocated in response to volatile memory allocation requests, or reserved for such an allocation request, while persistent type memory pages may refer to memory pages of persistent memory allocated in response to persistent memory allocation requests, or reserved for such an allocation requests.

Such dynamic allocation requests may be serviced by system software through metadata generated by the system software. The metadata may include a memory type indicator that may identify each allocated memory page of persistent memory 106 as either a volatile type page or a persistent type page. This metadata may also enable dynamic conversion of persistent type memory pages to volatile type memory pages, or vice versa. This dynamic conversion may be accomplished without the need to physically copy the data from a persistent type page to a volatile type page, or vice versa. Such a dynamic conversion may be achieved in some embodiments by merely changing the memory type indicator of the metadata from one memory type to the other.

Enabling dynamic conversion of persistent type memory pages to volatile type memory pages, and vice versa, may enable a reduction in power that would be consumed by copying data from a conventional persistent storage device to conventional volatile memory to make the data accessible by CPU 102, or vice versa to free volatile memory or make volatile data persistent. In addition, because the copying of data may be reduced, the number of write operations to each location in memory may be correspondingly reduced. This reduction in write operations may increase the longevity of the underlying memory media due to physical limitations on the number of write operations that can be endured by some types of memory media. Another advantage of such a configuration is that, because volatile type memory and persistent type memory coexist on the same underlying media, and may be dynamically converted from one type to another, a single encryption scheme may be utilized for both volatile type memory pages and persistent type memory pages.

In embodiments, because persistent type memory is in the addressable physical address space of CPU 102, CPU 102 may have direct access to the data within persistent type memory pages without the need for going through an I/O controller to access the persistent type memory pages. As such, an application, or process, being executed by CPU 102 may not need to utilize an OS's storage stack (e.g., block driver and/or file system) to access the persistent type pages and may be able to access the persistent type pages directly. To accomplish this, in some embodiments, physical addresses for persistent memory 106 may be loaded into, for example, a page table of the application to enable direct access of persistent type memory pages by CPU 102. This is discussed in further detail in reference FIGS. 2 and 3 below.

While depicted here as a 2LM configuration, it will be appreciated that other memory configurations may be utilized as well. For example, in other embodiments, computing system 100 may include a single level memory (1LM) configuration that may include distinct volatile memory (e.g., DRAM) as main memory that may be utilized to store volatile data and persistent memory 106 that may be utilized to store persistent data. However, because, as discussed above, persistent memory 106 may also be utilized to store volatile data, system software may be configured to allocate a portion of persistent memory 106 as volatile type memory in the event that a volatile memory allocation request is received that is not able to be serviced out of the volatile memory. As such, persistent memory 106 may act as an overflow for main memory. In still other embodiments, computing system 100 may include only persistent memory 106, without any volatile memory or near memory cache.

Figure 2:
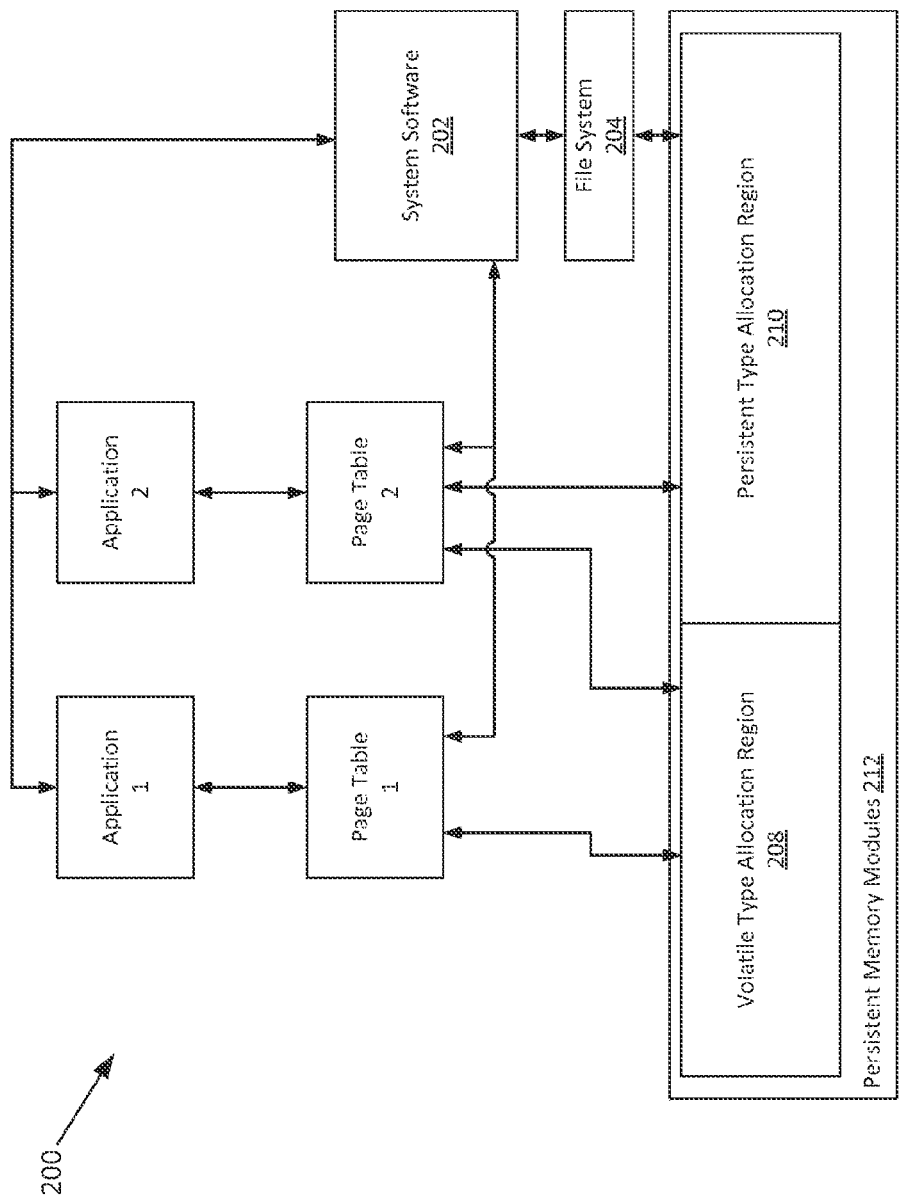
FIG. 2 illustrates an example system for dynamically allocating regions of persistent memory as volatile type memory, in accordance with various embodiments of the present disclosure.

FIG. 2 illustrates an example system 200 with persistent memory, in accordance with various embodiments of the present disclosure. The system may include a number of applications, or processes, (e.g. applications 1 and 2) being executed by one or more processors (e.g., CPU 102 of FIG. 1 or processor(s) 502 of FIG. 5). Applications 1 and 2 may utilize memory page tables 1 and 2 (hereinafter, simply page tables), respectively, to access data stored on persistent memory modules 212. Page tables 1 and 2 may provide a mapping between logical memory of applications 1 and 2 and physical memory addresses of data stored within persistent memory modules 212. Page tables 1 and 2 may be managed e.g., by system software 202. In embodiments, system software 202 may be a part of an OS or a virtual machine monitor (VMM). System software 202 may in turn be communicatively coupled with file system 204 to utilize file system 204 in accessing persistent type allocation region 210 and page tables 1 and 2 to manage page tables 1 and 2.

System software 202 may be configured to receive volatile and persistent memory allocation requests from applications 1 and 2. In response to the memory allocation requests, system software 202 may dynamically allocate memory pages of persistent memory modules 212 as either volatile type memory pages or persistent type memory pages. As such, the system software may be able to dynamically grow or shrink the amount of volatile type memory available to the one or more applications.

As discussed above in reference to FIG. 1, such dynamic allocations may be serviced by system software 202 through metadata generated by system software 202. The metadata may include a memory type indicator that may identify each allocated memory page of persistent memory modules 212 as either a volatile type page or a persistent type page. This metadata may also enable dynamic conversion of persistent type memory pages to volatile type memory pages, or vice versa. Such a dynamic conversion may be achieved in some embodiments by merely changing the memory type indicator of the metadata from one memory type to the other.

In some embodiments, system software 202 may be configured to initialize at least a subset of memory pages of the persistent memory modules 212 as persistent type memory pages and a subset of memory pages of persistent memory modules 212 as volatile type memory pages. In other embodiments, system software 202 may be configured to initialize all of the available memory pages of persistent memory modules 212 as persistent type memory pages and may dynamically allocate memory pages of the persistent memory modules as volatile type memory pages, in response to volatile memory allocation requests, by converting persistent type memory pages to volatile type memory pages. In addition, system software 202 may be configured to release volatile type memory pages for re-allocation in response to a reset procedure or shut-down procedure to replicate the volatility of conventional volatile memory (e.g., DRAM).

File system 204 may provide access of persistent type allocation region 210 to applications 1 and 2. It will be appreciated that file system 204 is merely meant to be representative of one mechanism for accessing persistent type allocation region 210 in a legacy manner. File system 204 may represent any type of traditional persistent storage management.

Application 1 may be configured to access persistent type memory module 212 in two different ways based upon whether the allocation was volatile or persistent. Such a configuration may be utilized, for example, by legacy applications configured to utilize two distinct access methodologies, one access methodology for volatile type memory (e.g., DRAM) and another access methodology for a persistent storage device (e.g., magnetic disk). However, because system 200 includes persistent memory modules 212, this single type of media may contain both volatile type allocations and persistent type allocations. As such, regardless of the access methodology utilized by application 1, accesses of both volatile and persistent data may lead to persistent memory modules 212. For example, as depicted, application 1 may access volatile type allocation region 208 of persistent memory modules 212 via page table 1 and may access persistent type allocation region 210 via system software 202 and file system 204. To accomplish this, system software 202 may be configured with legacy application programming interfaces (APIs) exposed to application 1 to enable application 1 to function properly in system 200 without the need to update or adapt the underlying code of application 1 for system 200.

In addition to the legacy APIs discussed above, system software 202 may expose additional API's to the applications that may be configured to further optimize the performance of these applications. For example, system software 202 may expose storage abstractions that include a dynamic memory conversion request type to allow applications to dynamically convert volatile type pages into persistent type pages and vice-versa. The additional API's may also enable an application to have persistent type pages loaded into the page table for direct access by the application. Such a configuration is depicted by application 2. As depicted, application 2 is capable of accessing both volatile type allocation region 208 and persistent type allocation region 210 via page table 2. This may be accomplished by utilizing the additional API's to load persistent type memory pages into page table 2. Such a page table is depicted in reference to FIG. 3.

In addition, in some embodiments, an application, such as applications 1 or 2, may be configured to utilize a volatile memory allocation primitive, such as, for example, "malloc_ip," which may be similar in some aspects to malloc. It will be appreciated that malloc_ip is utilized for illustrative purposes only, and such a volatile memory allocation primitive may be called by any other name. By invoking malloc_ip, the application may cause system software 202 to both allocate volatile type memory pages to the application and indicate to system software 202 that the application may intend to persist the data contained within the volatile type allocation at a later time instead of freeing it. After the data is written to the volatile type allocation, the application can request that the data become persistent, for example, by invoking a call to system software 202 to convert the data contained within the volatile type allocation to a persistent type allocation along with the name/path of a file to persist the data to. Instead of copying the data to the specified file/object, system software 202 can simply convert the volatile type memory pages to persistent type memory pages, as discussed elsewhere herein, along with associating the converted memory pages with the file/object name. As an example, the above discussed configuration can be used to support an operation where a file can be downloaded directly from a network to persistent type allocation region 210.

Figure 3:
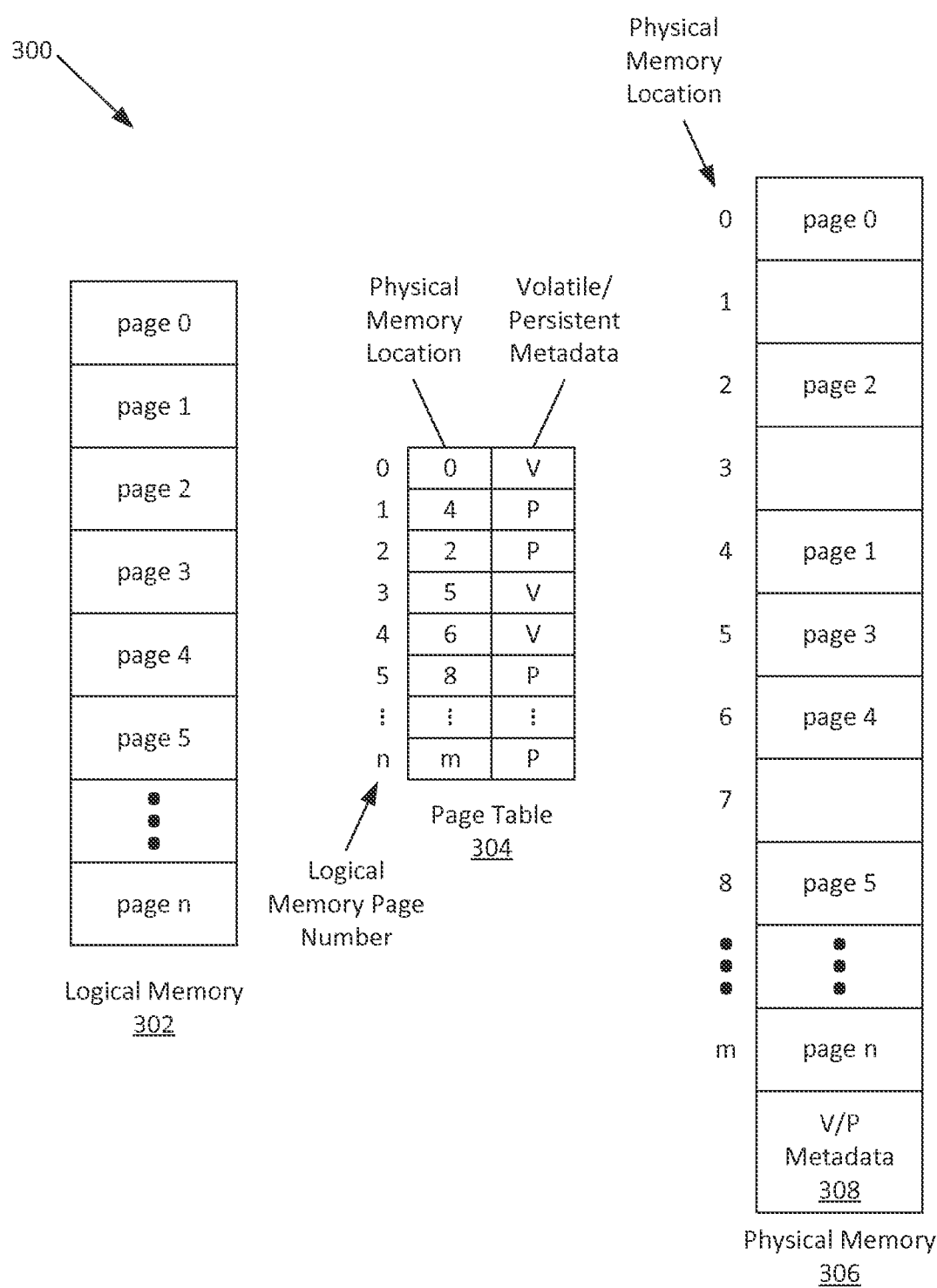
FIG. 3 illustrates an example memory configuration having dynamically allocated persistent/volatile memory pages, in accordance with various embodiments of the present disclosure.

FIG. 3 illustrates an example memory access configuration 300 having dynamically allocated persistent and volatile memory pages, in accordance with various embodiments of the present disclosure. As depicted, memory configuration 300 may include logical memory 302 depicting consecutive memory pages for use by an application (e.g., applications 1 or 2 of FIG. 2). Page table 304 may correlate the memory pages of logical memory 302 with physical memory locations of physical memory 306. Physical memory locations of physical memory 306 may alternatively be referred to as physical memory frames. As used herein, physical memory 306 may refer to persistent memory modules (e.g., persistent memory 106 of FIG. 1 or persistent memory modules 212 of FIG. 2). As depicted, page table 304 may be loaded with metadata describing the individual pages. For example, page table 304, as depicted, may include a column containing either a 'V' that may designate the corresponding memory location as a volatile type memory page or a 'P' that may designate the corresponding memory location as persistent type memory page. In addition, the metadata concerning the allocation types of individual pages may be stored in a reserved location of physical memory 306 (e.g., V/P metadata 308). This reserved location may be accessible to system software (e.g., system software 202 of FIG. 2) during a device boot procedure or during a device shut-down procedure. For example, memory pages allocated as volatile type memory pages may be released for reallocation during a shut-down procedure, while memory pages allocated as persistent may need to be maintained. While v/p metadata 308 is depicted as being aggregated into a single location, it will be appreciated that v/p metadata 308 may be divided into two or more pieces of metadata. For example, volatile metadata referencing volatile type memory pages and persistent metadata referencing persistent type memory pages may be maintained in separate metadata locations. In another example, the volatile/persistent metadata may be distributed through the physical memory locations such that each physical memory location may have metadata contained therein describing the data stored therein as volatile type data or persistent type data. It will be appreciated that any format and/or location of v/p metadata 308 is contemplated by this disclosure.

Figure 4:
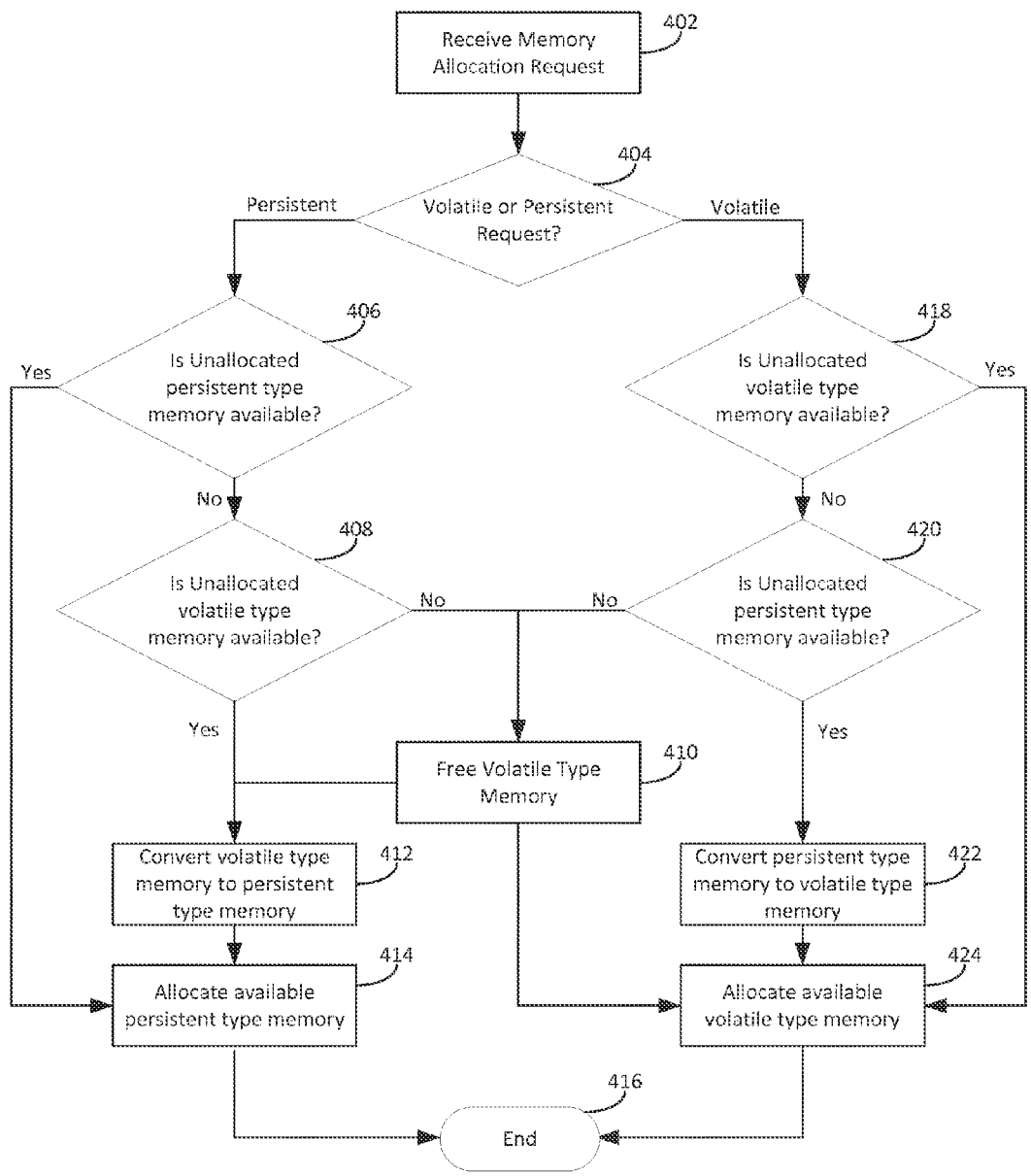
FIG. 4 illustrates an example process flow for dynamically allocating regions of persistent memory as persistent type memory and volatile type memory, in accordance with various embodiments of the present disclosure.

FIG. 4 illustrates an example process flow 400 for dynamically allocating persistent memory by a computing device, in accordance with various embodiments of the present disclosure. Process flow 400 may be carried out by, for example, system software 202 of FIG. 2 disposed on the computing device. Process flow 400 may begin at block 402 where a memory allocation request may be received, by system software of the computing device, from one or more applications or processes executing on the computing device. In some embodiments, such a memory allocation request may be received by one or more application programming interfaces (APIs) exposed by system software to the one or more applications or processes.

At block 404, system software may determine if the allocation request is for a persistent type allocation or a volatile type allocation. In embodiments where it is determined that the allocation request is for a persistent type allocation, the process may proceed to block 406. In embodiments, where it is determined that the allocation request is a volatile type allocation the process may proceed to block 418.

At block 406 a determination may be made as to whether unallocated persistent type memory is available. If unallocated persistent type memory is available then the process may proceed to block 414 where the unallocated persistent type memory may be allocated (e.g., by updating a file allocation table of a file system) to satisfy the memory allocation request, after which, the process may end at block 416. If, however, unallocated persistent type memory is unavailable, then the process may proceed from block 406 to block 408.

At block 408 a determination may be made as to whether unallocated volatile type memory is available. If unallocated volatile type memory is available then the process may proceed to block 412 where the unallocated volatile type memory may be converted to persistent type memory. If, however, unallocated volatile type memory is unavailable, then the process may proceed from block 408 to block 410. At block 410, system software may free volatile type memory. This may be accomplished, for example, by de-allocating volatile type memory that may no longer be used. Such an instance may occur, for example, if an application or process that had volatile type memory allocated to it is no longer active. Once volatile type memory has been freed the process may proceed to block 412. At block 412, the freed volatile type memory may be converted to persistent type memory to make persistent type memory available for satisfying the allocation request. This may be accomplished, as discussed above, by manipulating metadata associated with the freed volatile type memory.

Once persistent type memory is available to satisfy the memory allocation request, the persistent type memory may be allocated (e.g., by updating a file allocation table of a file system). Once the allocation request has been satisfied, the process may proceed to block 416 where the process may end.

Returning to block 404, if the memory allocation request is for the allocation of volatile type memory, the process may proceed to block 418. At block 418 a determination may be made as to whether unallocated volatile type memory is available. If unallocated volatile type memory is available then the process may proceed to block 424 where the unallocated volatile type memory may be allocated to satisfy the memory allocation request (e.g., by updating a page table associated with the application, or process, making the memory allocation request), after which, the process may end at block 416. If, however, unallocated volatile type memory is unavailable, then the process may proceed from block 418 to block 420.

At block 420 a determination may be made as to whether unallocated persistent type memory is available. If unallocated persistent type memory is available then the process may proceed to block 422 where the unallocated persistent type memory may be converted to volatile type memory, this may be accomplished in a similar manner to that described elsewhere herein. If, however, unallocated persistent type memory is unavailable, then the process may proceed from block 420 to block 410. At block 410, system software may free volatile type memory. This may accomplished, for example, by de-allocating volatile type memory that may no longer be used. Such an instance may occur, for example, if an application or process that had volatile type memory allocated to it is no longer active. Once volatile type memory has been freed the process may proceed to block 424. Once persistent type memory is available to satisfy the memory allocation request, the persistent type memory may be allocated (e.g., by updating a file allocation table of a file system). Once the allocation request has been satisfied, the process may proceed to block 416 where the process may end.

Figure 5:
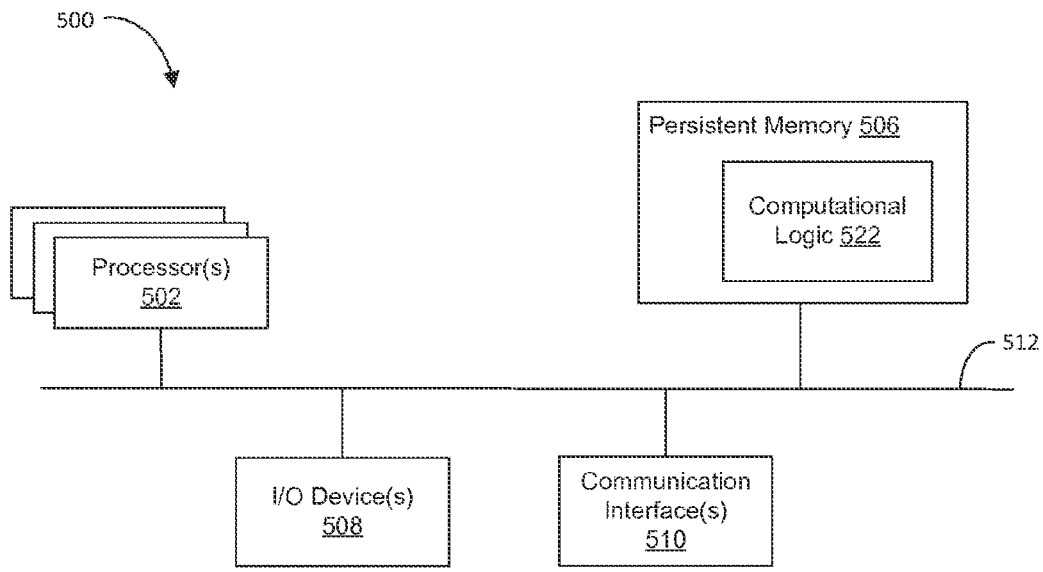
FIG. 5 is a schematic illustration of an example computing device, in accordance with various embodiments of the present disclosure.

Referring now to FIG. 5, wherein an example computing device with persistent memory, in accordance with various embodiments, is illustrated. As shown, computing device 500 may include one or more processors or processor cores 502, and persistent memory 506. In embodiments, multiple processor cores 502 may be disposed on one die. For the purpose of this application, including the claims, the terms "processor" and "processor cores" may be considered synonymous, unless the context clearly requires otherwise. Computing device 500 may also include volatile memory (e.g., DRAM) and/or mass storage device(s) (e.g., diskette, hard drive, compact disc read-only memory (CD-ROM), and so forth), input/output (I/O) device(s) 508 (such as camera, display device, keyboard, cursor control, gyroscope, accelerometer, and so forth), and communication interfaces 510 (such as network interface cards, modems, and so forth). In embodiments, a display device may be touch screen sensitive and may include a display screen, one or more processors, storage medium, and communication elements. Further, it may be removably docked or undocked from a base platform having the keyboard. The elements may be coupled to each other via system bus 512, which may represent one or more buses. In the case of multiple buses, they may be bridged by one or more bus bridges (not shown). In embodiments, persistent memory 506 may be coupled with processor(s) 502 via a memory bus.

Each of these elements may perform its conventional functions known in the art. Persistent memory 506 may be employed to store a copy, both operational and permanent, of programming instructions implementing the operations described earlier, e.g., but not limited to, operations associated with system software 202 of FIG. 2. Persistent memory 506 may be employed to store a copy, both operational and permanent, of programming instructions implementing other applications as well. Collectively, these instructions are denoted as computational logic 522. The various operations may be implemented by assembler instructions supported by processor(s) 502 or high-level languages, such as, for example, C, that may be compiled into such instructions.

The copy of the programming instructions may be placed into persistent memory 506 in the factory, or in the field, through, for example, a distribution medium (not shown), such as a compact disc (CD), or through communication interface 510 (from a distribution server (not shown)). That is, one or more distribution media having an implementation of system software 202 may be employed to distribute these components to various computing devices.

The number, capability, and/or capacity of these elements 510-512 may vary, depending on the intended use of example computing device 500, e.g., whether example computer 500 is a smartphone, tablet, ultrabook, laptop, desktop, or server. The constitutions of these elements 510-512 are otherwise known, and accordingly will not be further described.

Figure 6:
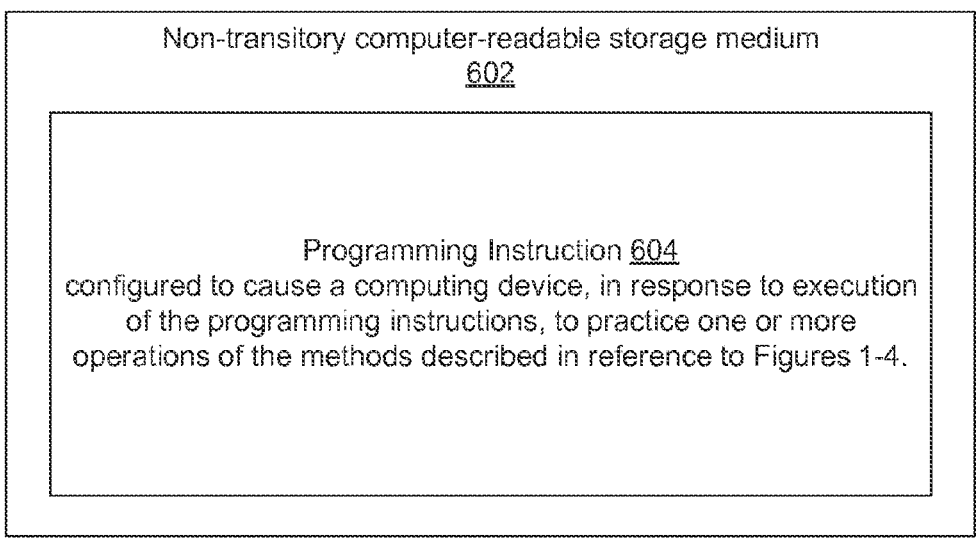
FIG. 6 illustrates an example non-transitory computer-readable storage medium having instructions configured to practice all or selected ones of the operations associated with the processes described above.

FIG. 6 illustrates an example non-transitory computer-readable storage medium having instructions configured to practice all or selected ones of the operations associated with the processes described above. As illustrated, non-transitory computer-readable storage medium 602 may include a number of programming instructions 604. Programming instructions 604 may be configured to enable a device, e.g., computing device 500, in response to execution of the programming instructions, to perform one or more operations of the processes described in reference to FIGS. 1-4. In alternate embodiments, programming instructions 604 may be disposed on multiple non-transitory computer-readable storage media 602 instead. In still other embodiments, programming instructions 604 may be encoded in transitory computer-readable signals.

Referring back to FIG. 5, for one embodiment, at least one of processors 502 may be packaged together with memory having computational logic 522 (in lieu of storing in persistent memory 506) configured to perform one or more operations of the processes described with reference to FIGS. 1-4. For one embodiment, at least one of processors 502 may be packaged together with memory having computational logic 522 configured to practice aspects of the methods described in reference to FIGS. 1-4 to form a System in Package (SiP). For one embodiment, at least one of processors 502 may be integrated on the same die with memory having computational logic 522 configured to perform one or more operations of the processes described in reference to FIGS. 1-4. For one embodiment, at least one of processors 502 may be packaged together with memory having computational logic 522 configured to perform one or more operations of the process described in reference to FIGS. 1-4 to form a System on Chip (SoC). Such an SoC may be utilized in any suitable computing device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, module may refer to a software module, a hardware module, or any number or combination thereof.

As used herein, the term module includes logic that may be implemented in a hardware component or device, software or firmware that may be run or running on a processor, or a combination of processors. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Examples

Some non-limiting examples are:

Example 1 may include an apparatus for computing comprising: one or more processors; a plurality of persistent memory modules coupled with the one or more processors; and system software to be operated by the one or more processors to: receive volatile memory allocation requests and persistent memory allocation requests from one or more applications executed by the one or more processors; and dynamically allocate memory pages of the persistent memory modules as: volatile type memory pages in response to the volatile memory allocation requests; and persistent type memory pages in response to the persistent memory allocation requests.

Example 2 may include the subject matter of Example 1, wherein to dynamically allocate memory pages further comprises: generation of persistent type metadata associated with each of the memory pages allocated, wherein the metadata includes a memory type indicator that identifies the respective memory page associated with the metadata as either a volatile type or a persistent type.

Example 3 may include the subject matter of Example 2, wherein the system software includes a dynamic memory conversion request type to enable the system software to: receive a conversion request to change a memory page, or each memory page of a plurality of memory pages, from one type of memory page to another type of memory page; and convert, in response to the conversion request, the memory page from the one type of memory page to the another type of memory page.

Example 4 may include the subject matter of Example 3, wherein the one type of memory page and the another type of memory page are selected, without repetition, from the group consisting of: a persistent type and a volatile type.

Example 5 may include the subject matter of Example 3, wherein to convert the memory page from the one type of memory page to the other type of memory page involves a change of the type indicator of the metadata respectively associated with the memory pages allocated.

Example 6 may include the subject matter of any one of Examples 2-5, wherein the system software is further to: receive a page load request to make one or more persistent type memory pages available to the one or more processors; and update, in response to the page load request, a page table associated with the page load request to include the one or more persistent type memory pages.

Example 7 may include the subject matter of any one of Examples 2-6, wherein the system software is further to: initialize at least a subset of the memory pages of the plurality of persistent memory modules as persistent type memory pages, and wherein to dynamically allocate memory pages of the persistent memory modules as volatile type memory pages involves conversion of persistent type memory pages to volatile type memory pages.

Example 8 may include the subject matter of any one of Examples 2-7, wherein the system software is further to: release volatile type memory pages for re-allocation in response to a reset procedure or shut-down procedure of the apparatus.

Example 9 may include the subject matter of any one of examples 1-8, wherein the system software is part of an operating system (OS) or a virtual machine monitor (VMM) of the apparatus.

Example 10 may include the subject matter of Examples 1-9, wherein the plurality of persistent memory modules are coupled with the one or more processors via a memory bus.

Example 11 may include a method of computing, comprising: receiving, by a system software of the computing device, volatile memory allocation requests and persistent memory allocation requests from one or more applications of the computing device; and dynamically allocating, by the system software, memory pages of a plurality of persistent memory modules as: volatile type memory pages in response to the volatile memory allocation requests; and persistent type memory pages in response to the persistent memory allocation requests.

Example 12 may include the subject matter of Example 11, wherein dynamically allocating memory pages further comprises: generating metadata associated with each of the memory pages allocated, wherein the metadata includes a memory type indicator that identifies the respective memory page associated with the metadata as either a volatile type or a persistent type.

Example 13 may include the subject matter of Example 12, further comprising: receiving, by the system software, a conversion request to change a memory page allocated from one type of memory page to another type of memory page; and converting, by the system software, in response to the conversion request, the memory page allocated from the one type of memory page to the another type of memory page, wherein the one type of memory page and the another type of memory page are selected, without repetition, from the group consisting of: a persistent type and a volatile type.

Example 14 may include the subject matter of Example 13, wherein converting the memory page from the one type of memory page to the other type of memory page involves changing the type indicator of the metadata respectively associated with the memory pages allocated.

Example 15 may include the subject matter of any one of Examples 11-14, further comprising: receiving, by the system software, a page load request to make one or more persistent type memory pages available to the one or more processors; and updating, by the system software, in response to the page load request, a page table associated with the page load request to include the one or more persistent type memory pages.

Example 16 may include the subject matter of any one of Examples 11-15, further comprising: initializing, by the system software, at least a subset of the memory pages of the plurality of persistent memory modules as persistent type memory pages, and wherein dynamically allocating memory pages of the persistent memory modules as volatile type memory pages involves converting persistent type memory pages to volatile type memory pages.

Example 17 may include the subject matter of any one of Examples 11-16, further comprising: releasing, by the system software, volatile type memory pages for re-allocation in response to a reset procedure or shut-down procedure of the apparatus.

Example 18 may include one or more computer-readable media having instructions stored thereon, wherein the instructions, in response to execution by a processor of the computing device, provide the computing device with system software to: receive volatile memory allocation requests and persistent memory allocation requests from one or more applications executed by the computing device; and dynamically allocate memory pages of a plurality of persistent memory modules as: volatile type memory pages in response to the volatile memory allocation requests; and persistent type memory pages in response to the persistent memory allocation requests.

Example 19 may include the subject matter of Example 18, wherein to dynamically allocate memory pages further comprises: generation of metadata associated with each of the memory pages allocated, wherein the metadata includes a memory type indicator that identifies the respective memory page associated with the metadata as either a volatile type or a persistent type.

Example 20 may include the subject matter of Example 19, wherein the system software is further to: receive a conversion request to change a memory page allocated from one type of memory page to another type of memory page; and convert, in response to the conversion request, the memory page allocated from the one type of memory page to the another type of memory page.

Example 21 may include the subject matter of Example 19, wherein the one type of memory page and the another type of memory page are selected, without repetition, from the group consisting of: a persistent type and a volatile type.

Example 22 may include the subject matter of Example 20, wherein to convert the memory page from the one type of memory page to the other type of memory page involves a change of the type indicator of the metadata respectively associated with the memory pages allocated.

Example 23 may include the subject matter of Example 19, wherein the system software is further to: initialize at least a subset of the memory pages of the plurality of persistent memory modules as persistent type memory pages, and wherein to dynamically allocate memory pages of the persistent memory modules as volatile type memory pages involves conversion of persistent type memory pages to volatile type memory pages.

Example 24 may include the subject matter of any one of Examples 18-23, wherein the system software is further to: release volatile type memory pages for re-allocation in response to a reset procedure or shut-down procedure of the apparatus.

Example 25 may include the subject matter of any one of Examples 18-24, wherein the system software is part of an operating system (OS) or a virtual machine monitor (VMM) of the apparatus.

Example 26 may include an apparatus for computing, comprising: means for receiving volatile memory allocation requests and persistent memory allocation requests from one or more applications of the computing device; and means for dynamically allocating memory pages of a plurality of persistent memory modules as: volatile type memory pages in response to the volatile memory allocation requests; and persistent type memory pages in response to the persistent memory allocation requests.

Example 27 may include the subject matter of Example 26, wherein the means for dynamically allocating memory pages further comprises: means for generating metadata associated with each of the memory pages allocated, wherein the metadata includes a memory type indicator that identifies the respective memory page associated with the metadata as either a volatile type or a persistent type.

Example 28 may include the subject matter of Example 27, further comprising: means for receiving a conversion request to change a memory page allocated from one type of memory page to another type of memory page; and means for converting, in response to the conversion request, the memory page allocated from the one type of memory page to the another type of memory page, wherein the one type of memory page and the another type of memory page are selected, without repetition, from the group consisting of: a persistent type and a volatile type.

Example 29 may include the subject matter of Example 28, wherein converting the memory page from the one type of memory page to the other type of memory page involves changing the type indicator of the metadata respectively associated with the memory pages allocated.

Example 30 may include the subject matter of any one of Examples 26-29, further comprising: means for receiving a page load request to make one or more persistent type memory pages available to the one or more processors; and means for updating in response to the page load request, a page table associated with the page load request to include the one or more persistent type memory pages.

Example 31 may include the subject matter of any one of Examples 26-30, further comprising: means for initializing at least a subset of the memory pages of the plurality of persistent memory modules as persistent type memory pages, and wherein dynamically allocating memory pages of the persistent memory modules as volatile type memory pages involves converting persistent type memory pages to volatile type memory pages.

Example 32 may include the subject matter of any one of Examples 26-31, further comprising: means for releasing volatile type memory pages for re-allocation in response to a reset procedure or shut-down procedure of the apparatus.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. An apparatus for computing comprising:
   one or more processors;
   a plurality of persistent memory modules with underlying persistent memory media coupled with the one or more processors, wherein a first portion of the persistent memory media is to be allocated as memory pages of a volatile type, and a second portion of the persistent memory media is to be allocated as memory pages of a persistent type; and
   system software to be operated by the one or more processors to:
      receive volatile memory allocation requests and persistent memory allocation requests from one or more applications executed by the one or more processors; and
      dynamically allocate memory pages of the first portion of the persistent memory media as volatile type memory pages in response to the volatile memory allocation requests; and allocate memory pages of the second portion of the persistent memory media as persistent type memory pages in response to the persistent memory allocation requests;
      wherein the volatile memory allocation requests from the one or more applications include indications from the one or more applications to persist data instead of freeing the data contained within the allocated volatile type memory pages of the first portion of the underlying persistent memory media; and
      wherein the one or more applications are to further request to convert the allocated volatile type memory pages of the first portion of the underlying persistent memory media to persistent type memory pages, after the data is written to the volatile type memory pages.

2. The apparatus of claim 1, wherein to dynamically allocate memory pages further comprises: to generate persistent type metadata associated with each of the memory pages allocated, wherein the metadata includes a memory type indicator that identifies a respective memory page associated with the metadata as either the volatile type or the persistent type.

3. The apparatus of claim 2, wherein the system software includes a dynamic memory conversion request type to enable the system software to:

receive a conversion request to change a memory page, or each memory page of a plurality of memory pages, from one type of memory page to another type of memory page; and convert, in response to the conversion request, the memory page from the one type of memory page to the another type of memory page.

4. The apparatus of claim 3, wherein the one type of memory page and the another type of memory page are selected, without repetition, from a group consisting of: a persistent type and a volatile type.

5. The apparatus of claim 3, wherein to convert the memory page from the one type of memory page to the other type of memory page involves a change of the type indicator of the metadata respectively associated with the memory pages allocated.

6. The apparatus of claim 2, wherein the system software is further to:

receive a page load request to make one or more persistent type memory pages available to the one or more processors; and update, in response to the page load request, a page table associated with the page load request to include the one or more persistent type memory pages.

7. The apparatus of claim 2, wherein the system software is further to: initialize at least a subset of the memory pages of the plurality of persistent memory modules as persistent type memory pages, and wherein to dynamically allocate memory pages of the persistent memory modules as volatile type memory pages involves conversion of persistent type memory pages to volatile type memory pages.

8. The apparatus of claim 1, wherein the system software is further to: release volatile type memory pages for re-allocation in response to a reset procedure or shut-down procedure of the apparatus.

9. The apparatus of claim 1, wherein the system software is part of an operating system (OS) or a virtual machine monitor (VMM) of the apparatus.

10. The apparatus of claim 1, wherein the plurality of persistent memory modules are coupled with the one or more processors via a memory bus.

11. A method of computing, comprising:

receiving, by a system software of a computing device having one or more processors, volatile memory allocation requests and persistent memory allocation requests from one or more applications of the computing device, to allocate a plurality of persistent memory modules with underlying persistent memory media, wherein a first portion of the persistent memory media is to be allocated as memory pages of a volatile type, and a second portion of the persistent memory media is to be allocated as memory pages of a persistent type; and dynamically allocating, by the system software, memory pages of the first portion of the underlying persistent memory media as volatile type memory pages in response to the volatile memory allocation requests; and allocating memory pages of the second portion of the underlying persistent memory media as persistent type memory pages in response to the persistent memory allocation requests;

wherein the volatile memory allocation requests from the one or more applications include indications from the one or more applications to persist data instead of freeing the data contained within the allocated volatile type memory pages of the first portion of the underlying persistent memory media; and wherein the one or more applications are to further request to convert the allocated volatile type memory pages of the first portion of the underlying persistent memory media to persistent type memory pages, after the data is written to the volatile type memory pages.

12. The method of claim 11, wherein dynamically allocating memory pages further comprises: generating metadata associated with each of the memory pages allocated, wherein the metadata includes a memory type indicator that identifies a respective memory page associated with the metadata as either the volatile type or the persistent type.

13. The method of claim 12, further comprising:

receiving, by the system software, a conversion request to change a memory page allocated from one type of memory page to another type of memory page; and converting, by the system software, in response to the conversion request, the memory page allocated from the one type of memory page to the another type of memory page, wherein the one type of memory page and the another type of memory page are selected, without repetition, from a group consisting of: a persistent type and a volatile type.

14. The method of claim 13, wherein converting the memory page from the one type of memory page to the other type of memory page involves changing the type indicator of the metadata respectively associated with the memory pages allocated.

15. The method of claim 11, further comprising:

receiving, by the system software, a page load request to make one or more persistent type memory pages available to the one or more processors; and updating, by the system software, in response to the page load request, a page table associated with the page load request to include the one or more persistent type memory pages.

16. The method of claim 11, further comprising: initializing, by the system software, at least a subset of the memory pages of the plurality of persistent memory modules as persistent type memory pages, and wherein dynamically allocating memory pages of the persistent memory modules as volatile type memory pages involves converting persistent type memory pages to volatile type memory pages.

17. The method of claim 11, further comprising: releasing, by the system software, volatile type memory pages for re-allocation in response to a reset procedure or shut-down procedure of the computing device.

18. One or more non-transitory computer-readable media having instructions stored thereon, wherein the instructions, in response to execution by a processor of a computing device, provide the computing device with system software to:

receive volatile memory allocation requests and persistent memory allocation requests from one or more applications executed by the computing device, to allocate a plurality of persistent memory modules with underlying persistent memory media, wherein a first portion of the underlying persistent memory media is to be allocated as memory pages of a volatile type, and a second portion of the underlying persistent memory media is to be allocated as memory pages of a persistent type; and dynamically allocate memory pages of the first portion of the persistent memory media as volatile type memory pages in response to the volatile memory allocation requests; and allocate memory pages of the second portion of the persistent memory media as persistent type memory pages in response to the persistent memory allocation requests;

wherein the volatile memory allocation requests from the one or more applications include indications from the one or more applications to persist data instead of freeing the data contained within the allocated volatile type memory pages of the first portion of the underlying persistent memory media; and wherein the one or more applications are to further request to convert the allocated volatile type memory pages of the first portion of the underlying persistent memory media to persistent type memory pages, after the data is written to the volatile type memory pages.

19. The non-transitory computer-readable media of claim 18, wherein to dynamically allocate memory pages further comprises: to generate metadata associated with each of the memory pages allocated, wherein the metadata includes a memory type indicator that identifies a respective memory page associated with the metadata as either the volatile type or the persistent type.

20. The non-transitory computer-readable media of claim 19, wherein the system software is further to:

receive a conversion request to change a memory page allocated from one type of memory page to another type of memory page; and convert, in response to the conversion request, the memory page allocated from the one type of memory page to the another type of memory page.

21. The non-transitory computer-readable media of claim 20, wherein the one type of memory page and the another type of memory page are selected, without repetition, from a group consisting of: a persistent type and a volatile type.

22. The non-transitory computer-readable media of claim 20, wherein to convert the memory page from the one type of memory page to the other type of memory page involves a change of the type indicator of the metadata respectively associated with the memory pages allocated.

23. The non-transitory computer-readable media of claim 19, wherein the system software is further to: initialize at least a subset of the memory pages of the plurality of persistent memory modules as persistent type memory pages, and wherein to dynamically allocate memory pages of the persistent memory modules as volatile type memory pages involves conversion of persistent type memory pages to volatile type memory pages.

24. The non-transitory computer-readable media of claim 18, wherein the system software is further to: release volatile type memory pages for re-allocation in response to a reset procedure or shut-down procedure of the computing device.

25. The non-transitory computer-readable media of claim 18, wherein the system software is part of an operating system (OS) or a virtual machine monitor (VMM) of the computing device.

* * * * *